(12) United States Patent
Kawano et al.

(10) Patent No.: US 7,581,880 B2
(45) Date of Patent: Sep. 1, 2009

(54) RADIANT-TEMPERATURE MEASUREMENT DEVICE, LIGHT-SOURCE TEMPERATURE CONTROL DEVICE, IMAGE PROJECTION APPARATUS AND RADIANT-TEMPERATURE MEASUREMENT METHOD

(75) Inventors: Hiroyuki Kawano, Chiyoda-ku (JP);
Tatsuki Okamoto, Chiyoda-ku (JP);
Toshirou Nakashima, Chiyoda-ku (JP);
Kazuo Takashima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 167 days.

(21) Appl. No.: 11/754,493

(22) Filed: May 29, 2007

(65) Prior Publication Data

US 2008/0062404 A1    Mar. 13, 2008

(30) Foreign Application Priority Data

Sep. 12, 2006    (JP) .............................. 2006-246773

(51) Int. Cl.
*G01K 11/00*    (2006.01)
(52) U.S. Cl. ..................................... 374/161
(58) Field of Classification Search ................. 374/121, 374/161, 17
See application file for complete search history.

(56) References Cited

U.S. PATENT DOCUMENTS 5,388,909 A * 2/1995 Johnson et al. ............. 374/161
5,568,978 A * 10/1996 Johnson et al. ............. 374/161
5,628,564 A * 5/1997 Nenyei et al. ............... 374/121

FOREIGN PATENT DOCUMENTS

JP    2-259434    10/1990
JP    8-152360    6/1996

* cited by examiner

*Primary Examiner*—Andre J Allen
(74) *Attorney, Agent, or Firm*—Oblon, Spivak, McClelland, Maier & Neustadt, P.C.

(57) ABSTRACT

A radiant-temperature measurement device includes a time-based data measurement unit for acquiring, based on an intensity of first light, a first data value during a first measuring interval in a first intensity duration, and a second data value during a second measuring interval in a second intensity duration. The time-based data measurement unit is also for acquiring, based on an intensity of second light, a third data value in a first wavelength band, and a fourth data value in a second wavelength band, during the first measuring interval, and a fifth data value in the first wavelength band, and a sixth data value in the second wavelength band, during the second measuring interval. The radiant-temperature measurement device also includes a temperature calculation unit for calculating, based on the first, second, third, fourth, fifth, and sixth data values, a temperature of a light source at its light-emitting end.

11 Claims, 10 Drawing Sheets

RADIANT-TEMPERATURE MEASUREMENT DEVICE, LIGHT-SOURCE TEMPERATURE CONTROL DEVICE, IMAGE PROJECTION APPARATUS AND RADIANT-TEMPERATURE MEASUREMENT METHOD

BACKGROUND OF THE INVENTION

1. Field of the Invention

The present invention relates to radiant-temperature measurement technologies, in particular to radiant-temperature measurement devices, light-source temperature control devices, and image projection apparatus, as well as to radiant-temperature measurement methods.

2. Description of the Related Art

A spectrum according to thermal radiation or light emitted from a body depends on the temperature thereof. There is one of the methods that utilize spectrum change so as to measure the temperature, i.e. a two-color (ratio) or dual-wavelength radiant-temperature measurement method, in which temperature is obtained based on an intensity ratio of thermal radiations in two different wavelength bands; the method enables obtaining the temperature regardless of emissivity of the thermal radiation from a body.

However, in addition to the thermal radiation (light) from the body, when other light is superimposed as stray light, an error is imposed on the value of a temperature obtained. For example, in a case for which a discharge lamp is used as a light source, and when the temperature of electrode portions that are light-source's light-emitting ends is measured, because of strong discharge-light emission existing near by, the thermal radiation (light) from the electrode portions is resultantly measured with the discharge-light emission being superimposed thereon as the stray light. Therefore, in order to carry out the temperature measurement based on a thermal radiation spectrum, it is necessary to remove an influential component (or the amount of influence) caused by the stray light out from the measured value. As one means for removing an influential component owing to the stray light, there exists an invention described in Japanese Patent Application Publication No. JP1996-152360 (1996), Page 5, FIG. 1. In the invention, in order to remove the influential component owing to discharge-light emission, two wavelength bands are selected so as to exclude spectral peaks, of the discharge-light emission, causing the stray light, so that a dual-wavelength radiant-temperature measurement method is applied.

By measuring thermal radiation in a wavelength band excluding spectral peaks of the discharge-light emission, it is possible to eliminate an influence caused by the stray light up to a certain extent. However, actual spectra of discharge-light emission accompany continuous spectra over a wide range of wavelengths other than those in line spectra. As an example, spectra of discharge-light emission when an extra-high pressure mercury lamp is used as a discharge lamp are shown in FIG. 15. It should be understood that there exits discharge-light emission of near 700 nm wavelength when those peaks of line spectra are excluded.

As a purpose of measuring the electrode temperature of a lamp, a procedure is raised in which the characteristics of the lamp are investigated so as to extend its operating life. For this purpose, it is necessary to measure temperature of an electrode's tip or end, namely, the temperature of an electrode's portion in the very close proximity of which strong discharge-light emission exists. At such a portion, even when a tow-color (ratio) or dual-wavelength temperature measurement is carried out excluding wavelength bands in which discharge-light peaks exist, a stray-light component caused by discharge-light emission has been too large to achieve an accurate measurement of the portion's temperature. As described above, spectra of the stray light intended to be removed more or less have continuous components. For this reason, an influence caused by the stray light cannot be completely removed; because remaining influential components cannot be ignored, there has been a problem in that an accurate temperature measurement cannot be made.

The present invention has been directed at solving these problems described above, and an object of the invention is to provide a temperature measurement device and its method by removing stray-light components from a measured value of thermal radiation (light) on which stray light is superimposed.

In general, because there has not been a means for measuring electrode's temperature of a discharge lamp in real time, the lamp cannot be driven while the electrode's temperature is being controlled.

In addition, although a discharge lamp is generally used for an image projection apparatus as a light source, because the electrode's temperature cannot be controlled at a constant level, there has been a problem in that useful life of the discharge lamp is shortened, requiring frequent replacement of the lamp.

SUMMARY OF THE INVENTION

In one aspect of the present invention, a radiant-temperature measurement device comprises:

a first measurement unit for measuring, from among light-source light emitted from a light source having light-emitting ends in which a pattern of variation in light intensity versus time is repeated at predetermined periods each including a first intensity duration and a second intensity duration during which the second intensity differs from the first intensity, intensity of first light originating in the light-source light;

a second measurement unit for measuring intensity of second light, in which stray light originating in the light-source light is superimposed onto thermal radiation emitted from one of the light-source's light-emitting ends, in each of a first wavelength band and a second wavelength band, whose wavelengths differ from each other;

a time-based data measurement unit for acquiring, based on the intensity of the first light, a first data value during a first measuring interval in the first intensity duration, and a second data value during a second measuring interval in the second intensity duration, and for acquiring, based on the intensity of the second light, a third data value in the first wavelength band, and a fourth data value in the second wavelength band, during the first measuring interval, and a fifth data value in the first wavelength band, and a sixth data value in the second wavelength band, during the second measuring interval; and a temperature calculation unit for calculating, based on the first, second, third, fourth, fifth, and sixth data values, the temperature of the light source at its light-emitting end.

In another aspect of the present invention, a radiant-temperature measurement device comprises: a measurement unit for measuring, from among light-source light emitted from a light source having light-emitting ends in which a pattern of variation in light intensity versus time is repeated at predetermined periods each including a first intensity duration and a second intensity duration during which the second intensity differs from the first intensity, intensity of first light originating in the light-source light, during a predetermined measuring interval, in either of a first wavelength band or a second wavelength band, whose wavelengths differ from each other, and for measuring intensity of second light, in which stray light originating in the light-source light is superimposed onto thermal radiation emitted from one of the light-source's light-emitting ends, during a measuring interval that differs from the predetermined measuring interval, in each of a first wavelength band and a second wavelength band, whose wavelengths differ from each other;

a drive unit for changing either a position or a direction of the measurement unit so that, during the predetermined measuring interval, the measurement unit measures the intensity of the first light, and during the measuring interval that differs from the predetermined measuring interval, the measurement unit measures the intensity of the second light;

a time-based data measurement unit for acquiring, based on the intensity of the first light, a first data value in the first intensity duration and during a first measuring interval in which the measurement unit measures the intensity of the first light, and a second data value in the second intensity duration and during a second measuring interval in which the measurement unit measures the intensity of the first light, and for acquiring, based on the intensity of the second light, a third data value in the first wavelength band, and a fourth data value in the second wavelength band, in the first intensity duration and during the third measuring interval in which the measurement unit measures the intensity of the second light, and a fifth data value in the first wavelength band, and a sixth data value in the second wavelength band, in the second intensity duration and during the fourth measuring interval in which the measurement unit measures the intensity of the second light; and a temperature calculation unit for calculating, based on the first, second, third, fourth, fifth, and sixth data values, the temperature of the light source at its light-emitting end.

In yet another aspect of the present invention, a light-source temperature control device comprises: a cooling unit for reducing the temperature of light-source's light-emitting ends; a radiant-temperature measurement device for measuring the temperature of a light-emitting end of the light source; and a temperature control unit, into which is inputted the light-source's light-emitting-end temperature obtained by the radiant-temperature measurement device, for controlling, based on the temperature of the light-source's light-emitting end, the operation of the cooling unit.

In yet another aspect of the present invention, an image projection apparatus comprises: a light source; an image display element; an image-projection optical system for shining light-source light from the light source onto the image display element, so as to project images on the image display element into a predetermined position; and the light-source temperature control device described above.

In yet another aspect of the present invention, a radiant-temperature measurement method comprises: a first step of measuring, from among light-source light emitted from a light source having light-emitting ends in which a pattern of variation in light intensity versus time is repeated at predetermined periods each including a first intensity duration and a second intensity duration during which the second intensity differs from the first intensity, intensity of first light originating in the light-source light;

a second step of measuring intensity of second light, in which stray light originating in the light-source light is superimposed onto thermal radiation emitted from one of the light-source's light-emitting ends, in each of a first wavelength band λ1 and a second wavelength band λ2, whose wavelengths differ from each other;

a third step of acquiring, based on the intensity of the first light, a first data value a0 during a first measuring interval in the first intensity duration, and a second data value b0 during a second measuring interval in the second intensity duration, and of acquiring, based on the intensity of the second light, a third data value a(λ1) in the first wavelength band λ1, and a fourth data value a(λ2) in the second wavelength band λ2, during the first measuring interval, and a fifth data value b(λ1) in the first wavelength band λ1, and a sixth data value b(λ2) in the second wavelength band λ2, during the second measuring interval; and a fourth step of calculating the temperature of the light source at its light-emitting end in such a way that, by substituting the first data value a0, the second data value b0, the third data value a(λ1), the fourth data value a(λ2), the fifth data value b(λ1), and the sixth data value b(λ2) into Equation (1) and Equation (2), thermal radiation intensity I1 in the first wavelength band λ1 and thermal radiation intensity I2 in the second wavelength band λ2, in the thermal radiation emitted from one of the light-source's light-emitting ends, are separated and evaluated each other, and simultaneously by substituting the thermal radiation intensity I1 in the first wavelength band λ1 and the thermal radiation intensity I2 in the second wavelength band λ2 into Equation (3), the intensity ratio R is obtained, and retained data showing the relationship between the intensity ratio R and the temperature is referred.

$$I1 = a(\lambda 1) - a0 \times \frac{b(\lambda 1) - a(\lambda 1)}{b0 - a0} \qquad \text{Equation (1)}$$

$$I2 = a(\lambda 2) - a0 \times \frac{b(\lambda 2) - a(\lambda 2)}{b0 - a0} \qquad \text{Equation (2)}$$

$$R = \frac{I1}{I2} \qquad \text{Equation (3)}$$

According to a radiant-temperature measurement device in the present invention, by utilizing the difference between characteristics of intensity variation versus time of thermal radiation (light) and stray light, an influence caused by stray light mixed in measured values of the light intensity is estimated; thereby, because only the thermal radiation components can be extracted, even in a case in which a large stray-light source exits at light-emitting ends, the temperature of light-emitting ends each can be accurately measured based on a thermal radiation measuring principle.

According to a light-source temperature control device in the present invention, by utilizing the difference between characteristics of intensity variation versus time of thermal radiation (light) and stray light, an influence caused by stray light mixed in measured values of the light intensity is estimated; thereby, only the thermal radiation components can be extracted. Based on the thermal radiation measuring principle, because a radiant-temperature measurement device that can accurately measure the temperature of light-emitting ends each is applied, even in a case in which a large stray-light source exits at the light-emitting ends, by applying a feedback control using a measured temperature signal, the temperature of light-emitting ends of a light source can be held within a constant range. By this arrangement, the operating life of the light source can be extended.

According to an image projection apparatus in the present invention, a light-source temperature control device that controls the temperature of light-emitting ends of a light source to be held within a constant range is implemented. Therefore, because the operating life of the light source can be extended, replacement frequency of the light source ascribable to a life of the light source can be reduced; because of reduction in maintenance hours, it is possible to expect an increase in usage of the image projection apparatus, and a decrease in maintenance costs.

According to a radiant-temperature measurement method in the present invention, by utilizing the difference between characteristics of intensity variation versus time of thermal radiation (light) and stray light, an influence caused by stray light and mixed in measured values of the light intensity is estimated; thereby, because only the thermal radiation components can be extracted, even in a case in which a large stray-light source exits at the light-emitting ends, the temperature of light-emitting ends each can be accurately measured based on the thermal radiation measuring principle.

The foregoing and other objects, features, aspects and advantages of the present invention will become more apparent from the following detailed description of the present invention when taken in conjunction with the accompanying drawings.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereunder, preferred embodiments according to the present invention will be described in detail with reference to the accompanying drawings.

Embodiment 1

Figure 1:
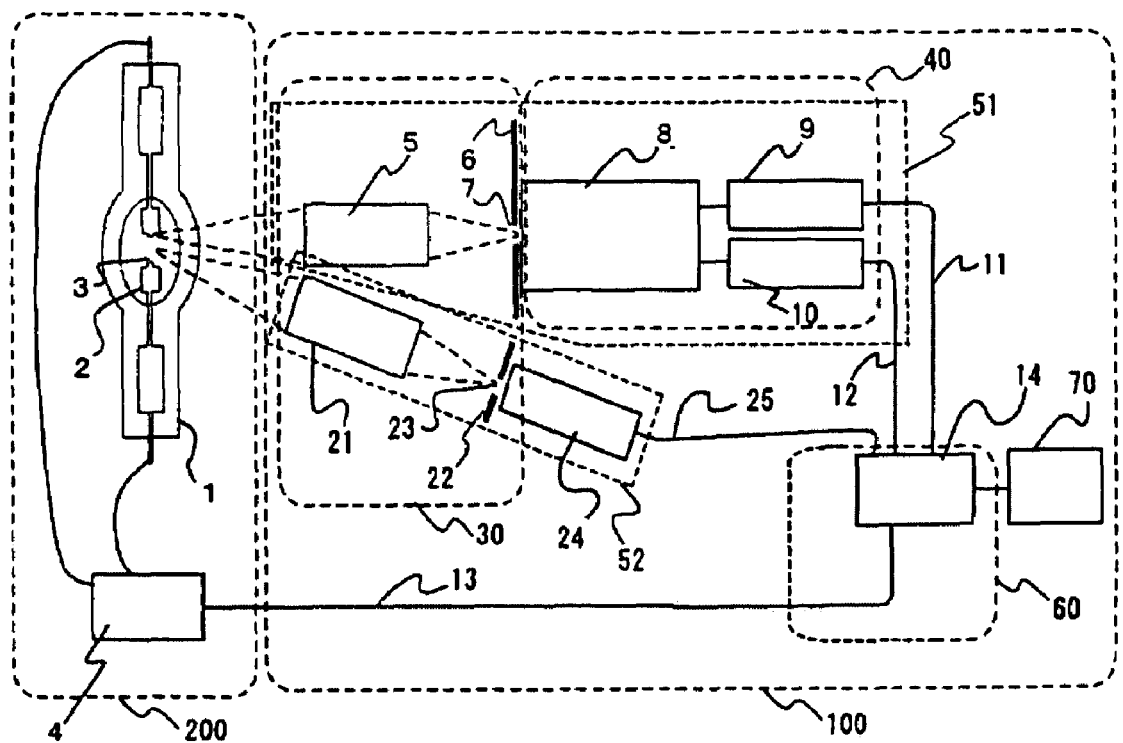
FIG. 1 is a diagram outlining a configuration of a radiant-temperature measurement device in Embodiment 1 of the present invention.

A radiant-temperature measurement device in Embodiment 1 of the present invention is shown FIG. 1. In FIG. 1, "100" is a radiant-temperature measurement device, and "200" is a light-source unit including a measuring object of which the radiant-temperature measurement device 100 measures temperature.

Hereinafter, a discharge lamp is taken into consideration as an example of a light source, and will be explained as follows. The light-source unit 200 is constructed of a discharge lamp 1 that is the light source, light-source drive circuitry 4, and cables interconnecting the both. In the discharge lamp 1, electrode portions 2 each and electrode ends 3 each that are protruded end-portions (tips) of the electrode portions 2 are formed as pairs, respectively, and are placed to oppose each other. Between the opposing electrode portions 2 or electrode ends 3, a voltage is supplied by way of the light-source drive circuitry 4 so that a discharge is produced between the opposing electrode ends 3, resulting in light emission by the discharge. Therefore, the electrode portions 2 or electrode ends 3 are light-emitting ends of the discharge light used as light-source light. The temperature of the light-emitting ends is thus a subject of measuring interest in the present invention.

Hereinafter, the explanation will be proceeded so that the electrode portions 2 are the light-emitting ends of the light-source light that is a temperature-measuring object. However, each of the electrode portions 2 is a conceptual portion that includes belonging one of the electrode ends 3.

The radiant-temperature measurement device 100 is provided to detect spectra of light due to thermal radiation that is radiated from the electrode portions 2 each as a measuring object, and to measure the temperature at the electrode portions 2 each based on the principle of a dual-wavelength radiant-temperature measurement method. The radiant-temperature measurement device 100 is constructed of a detection unit 50 (or a measurement unit in which the numeral is omitted in FIG. 1), a time-based analysis unit 60, and a temperature calculation unit 70. The detection unit 50, that is the measurement unit, is constructed of a main detection unit 51 that is a second measurement unit, and a subordinate detection unit 52 that is a first measurement unit. The main detection unit 51 is provided as a detection system that detects the light from the electrode portions 2 each as a temperature-measuring object, and is constructed of one part of a space analysis unit 30 and a spectrum analysis unit 40. The subordinate detection unit 52 is provided as another detection system that only detects discharge-light emission as a temperature-measuring object, and is constructed of the other part of the space analysis unit 30 and a following light detector 24.

First, the main detection unit 51 will be explained as follows. The part of the space analysis unit 30 of the main detection unit 51 has a function to limit a representative measuring object to the light from one of the electrode portions 2 of the discharge lamp 1. The part of the space analysis unit 30 of the main detection unit 51 is constructed of a projection unit 5 that forms the light, as a measuring object, emitted from either of the electrode portions 2 of the discharge lamp 1, onto a predetermined imaging surface as an optical image, and a screen 6 that has a pinhole 7 located on the imaging surface. By adjusting the pinhole 7 to coincide with the imaging point of light, basically, the light emitted from one of the electrode portions 2 passes through the pinhole 7, and the passed light is guided into the following spectrum analysis unit 40.

Although the light emitted from the electrode portions 2 is mainly originating in thermal radiation, discharge-light emission generated in the proximity of the electrode portions 2 is mixed as stray light onto the measuring light. Note that, it is possible to confirm that the measurement is carried out for the light emitted from one of the electrode portions 2 by forming an optical image onto the screen 6 before adjusting a position of the pinhole 7 to a light-imaging position, and by directly making visual observations. In addition, it is also possible to confirm by taking an exposure of the screen 6 using a camcorder. Moreover, as a method to adjust a light-imaging position to the pinhole 7 on the screen 6, it is also possible to confirm by shifting a position of the projection unit 5; on the other hand, it is also possible to confirm by changing a position of the pinhole 7 by shifting the screen 6.

The spectrum analysis unit 40 is constructed of a dual-wavelength spectral unit 8 that performs a spectral distribution of the light emitted from one of the electrode portions 2 of the discharge lamp 1, having been selected as a measuring object by the part of space analysis unit 30, into wavelength bands represented by two specific wavelengths $\lambda 1$ and $\lambda 2$ (hereinafter referred to as a "wavelength band $\lambda 1$" and a "wavelength band $\lambda 2$" for brevity), and two light detectors, i.e., a light detector 9 (for a channel 1) and a light detector 10 (for a channel 2) that are able to measure spectrally distributed light in the wavelength bands $\lambda 1$ and $\lambda 2$ in fast response time, respectively. Signals measured for the light in the wavelength bands $\lambda 1$ and $\lambda 2$ by using the light detectors 9 and 10 are inputted into a time-based analysis unit 60 via signal lines 11 and 12, respectively.

Next, the subordinate detection unit 52 will be explained as follows. The part of the space analysis unit 30 of the subordinate detection unit 52 is provided for the purpose of measuring the discharge-light emission only. The part of the space analysis unit 30 of the subordinate detection unit 52 is constructed of a projection unit 21 that forms the light from one predetermined point (position), among points in discharge-light emission generated between the opposing electrode ends 3 of the discharge lamp 1, onto a predetermined imaging surface as an optical image, and a screen 22 that has a pinhole 23 located on the imaging surface.

In order to measure the discharge-light emission only, the subordinate detection unit 52 is placed by changing or adjusting either a position or a direction thereof, so that the discharge-light emission is measured at a position distant from the electrode ends 3. As the confirmation method, as explained above, it is possible to confirm by forming an optical image onto the screen 22 before adjusting a position of the pinhole 23 to a light-imaging position, and by directly making visual observations. In addition, it is also possible to confirm by taking an exposure of the screen 22 using a camcorder. The light detector 24 is able to measure the light passed through the pinhole 23 in fast response time.

Signals measured for the light in the wavelength bands $\lambda 1$ and $\lambda 2$ outputted from the light detectors 9 and 10 of the main detection unit 51, and a signal measured for the discharge-light emission outputted from the light detector 24 of the subordinate detection unit 52 are inputted into the time-based analysis unit 60, respectively. The time-based analysis unit 60 has a time-based data measurement unit 14 that measures, having obtained a trigger signal (via its signal line 13) outputted from the light-source drive circuitry 4 that is a constituent element of the light-source unit 200, time-based waveforms based on the light-detector signals that correspond to time-based variation of the light in the wavelength bands $\lambda 1$ and $\lambda 2$, and to the discharge-light emission. Time-based waveform signals measured for the light in the wavelength bands $\lambda 1$ and $\lambda 2$, and a time-based waveform signal measured for the discharge-light emission, via the time-based data measurement unit 14, are together inputted into a temperature calculation unit 70. In the temperature calculation unit 70, based on these waveform signals, temperature of one of the electrode portions 2 that is a final representative measuring object is measured and evaluated.

Figure 2:
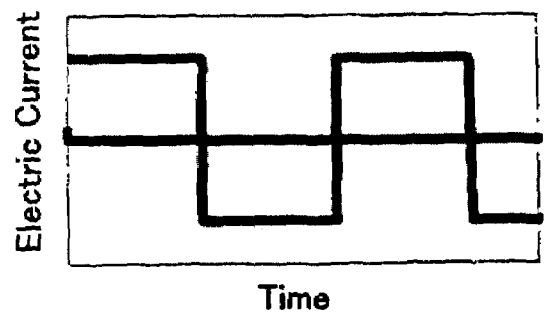
FIG. 2 is a waveform of a current supplied to a light source under an alternating-current (AC) drive without a superimposed pulse in Embodiment 1 of the present invention.

Hereinafter, an extra-high pressure mercury lamp that is driven in an alternating-current (AC) is taken into consideration as an example of the discharge lamp 1 composing the light-source unit 200, and the explanation will be proceeded as follows. The extra-high pressure mercury lamp is supplied with a stepwise-changing AC current (signal) from the light-source drive circuitry 4 as its current waveform is shown in FIG. 2, and according to the AC current (signal), discharge-light emission is generated. However, in a case using this lamp, because a phenomenon called flicker occurs in that an intensity distribution varies largely in short time, in order to mitigate the flicker, it is a common practice to supply the stepwise-changing AC current (signal) to the lamp with pulses superimposed. Here, the explanation will be given for a temperature measurement device and its method applied to measure temperature at the electrode portions 2 of the discharge lamp 1 that is using superimposed pulses.

Figure 3:
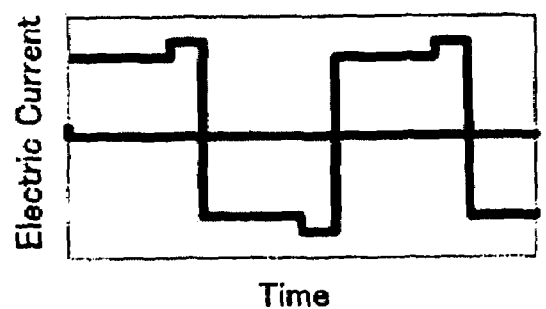
FIG. 3 is a waveform of a current supplied to the light source under an AC drive with superimposed pulses in Embodiment 1 of the present invention.

FIG. 3 shows a time-based waveform of a drive current onto which superimposed pulses are added, and supplied to the discharge lamp 1 from the light-source drive circuitry 4. In the figure, just before a current polarity reverses, a pulse is successively added with the same polarity before the reversal, so that the increased amount in the current waveform corresponds due to the superimposed pulses each.

Figure 4:
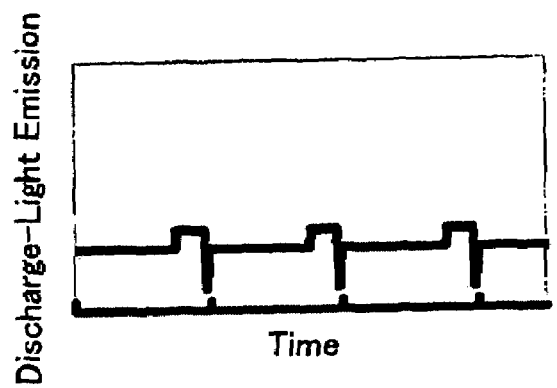
FIG. 4 is a waveform showing a variation of discharge-light emission intensity generated under the AC drive with superimposed pulses in Embodiment 1 of the present invention.

FIG. 4 shows time-based variation of discharge-light emission intensity (variation versus time) in a case in which the superimposed pulses are added, i.e. the lamp is AC driven under the time-based current as its waveform is shown in FIG. 3. From FIG. 4, it can be understood that discharge-light emission intensity increases corresponding to the time-duration the superimposed pulses each are added.

In this embodiment of the present invention, through the use of time-based variation of light-emission intensity when the superimposed pulses are added, influential components caused by the discharge-light emission that is mixed as stray light onto the measuring-object light are evaluated. And then, from the influential components caused by the discharge-light emission, contributory components in thermal radiation spectra are separated and evaluated; from the result obtained, temperature at the electrode portions is derived.

In this embodiment of the present invention, a basic principle of the temperature measurement is described more in detail as follows.

When the superimposed pulses are added to the electrode portions 2, discharge-light emission intensity not only increases, but also does electrode temperature in theory. Although, when the superimposed pulses are added, discharge-light emission intensity increases instantaneously; however, response time of temperature variation at the electrode portions 2 is extremely slow. Therefore, in a case of a drive current waveform in which the superimposed pulses short in width and small in magnitude (low in pulse-height) are added as shown in FIG. 3, it can be treated that the temperature does not change in practice. For example, when AC frequency of the current is 150 Hz, as can be understood from FIG. 4, one period of time of the light intensity is doubled with respect to the AC frequency; i.e., the frequency of the light intensity is 300 Hz, and its one period is as short as 3.3 ms. Although each of the superimposed pulses is added onto in the same period (i.e., in every 3.3 ms), the duration of each of the pulses is still about a fraction of the period. Therefore, in such a short time or duration, it can be presumed that the temperature at the electrode portions 2 is kept at a constant level.

Figure 5:
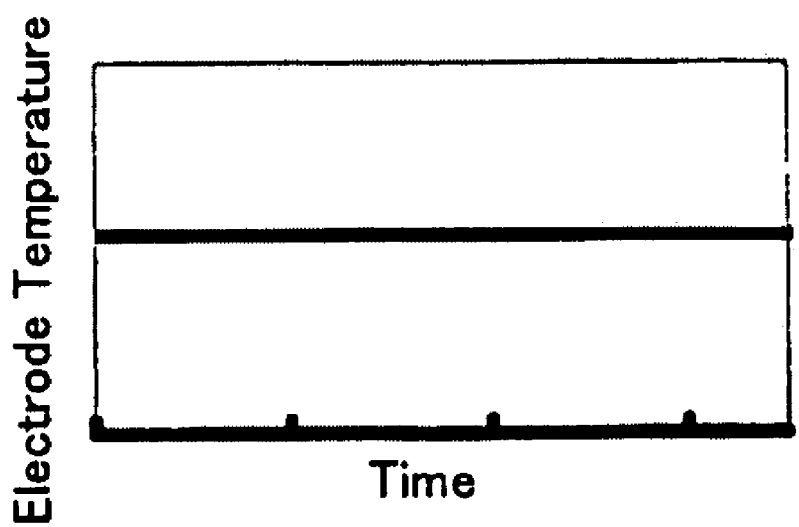
FIG. 5 is a waveform showing a temperature variation of an electrode portion of a lamp in Embodiment 1 of the present invention.

FIG. 5 shows temperature variation versus time at an end of one of the electrodes when the superimposed pulses are added in the same time scale (the horizontal axis) of FIG. 3 and FIG. 4. As can be understood from FIG. 5, it can be presumed that the temperature at the electrode portions 2 is kept at a constant level without depending on time in the degree of period of the discharge-light emission. Therefore, it can be presumed that intensity of the thermal radiation and its spectra emitted from the electrode portions 2 are also kept at constant levels without depending on time in the degree of period of the discharge-light emission.

By utilizing the characteristics in that, in a predetermined time range, on one hand, intensity of the discharge-light emission varies depending on time, on the other hand, intensity of the thermal radiation does not vary depending on time, influential components caused by the discharge-light emission are evaluated and then removed from the measured values, having been obtained via the light detectors 9 and 10 of the main detection unit 51, by applying the following principle; thus, components in the signals originating in the thermal radiation are only separated.

Because the explanation for the light detectors 9 and 10 is similar, hereinafter, time-based waveform signals relating to the light detector 9 and the light detector 24 will be explained as follows. A subject matter is to remove influential components caused by the discharge-light emission and mixed into the signal outputted from the light detector 9, and to evaluate a thermal radiation component only.

Figure 6:
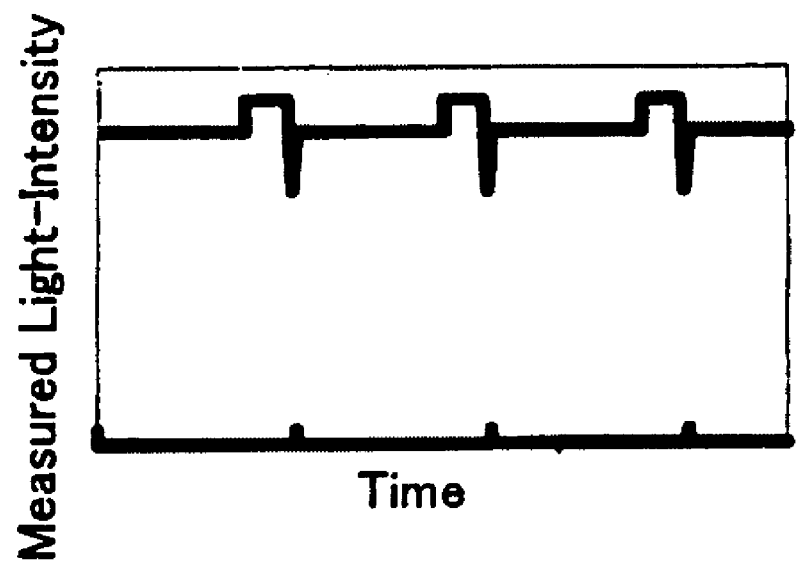
FIG. 6 is a waveform showing a time-based variation of measured light-intensity by using the radiant-temperature measurement device in Embodiment 1 of the present invention.

In FIG. 6, when the superimposed pulses are added onto the AC drive current supplied to the discharge lamp 1, and the light emitted from one of the electrode portions 2 of the discharge lamp 1 is detected by the light detector 9 and its outputted signal is measured by the time-based data measurement unit 14, a time-based waveform of measured light-intensity (variation versus time) at a wavelength band $\lambda 1$ is shown. This measured value (light-intensity) is equivalent to the sum of both measured vales, i.e. one originating in the thermal radiation that does not vary in time, and the other originating in the stray light caused by the discharge-light emission that varies in time and having been mixed into the light detector 9.

On the other hand, a time-based waveform of measured light-intensity, when the signal outputted from the light detector 24 of the subordinate detection unit 52 is measured by the time-based data measurement unit 14, comes out to be a similar time-based waveform to the time-based variation of the discharge-light emission shown in FIG. 4. In both the time-based waveforms, the varied amount in the measured light-intensity originating in the superimposed pulses is in either case originated in the discharge-light emission, and other factors are not included. For this reason, when a position that is a measuring object is the same, the varied amount should be the same value. When a measuring-object's position is different, light intensity is usually different; because of this, the varied amount of the measured values each originating in the superimposed pulses comes out to be proportional to the difference of light intensity.

The difference of light intensity according to the difference at the measuring-object's position has nothing to do with the existence of the superimposed pulses. Therefore, a ratio of the varied amount of the measured values each originating in the superimposed pulses and according to the difference at the measuring-object's position is directly equal to a ratio of the difference in the measured light-intensity originating in the discharge-light emission and according to the difference at the measuring-object's position, when the superimposed pulses are not added.

Figure 7:
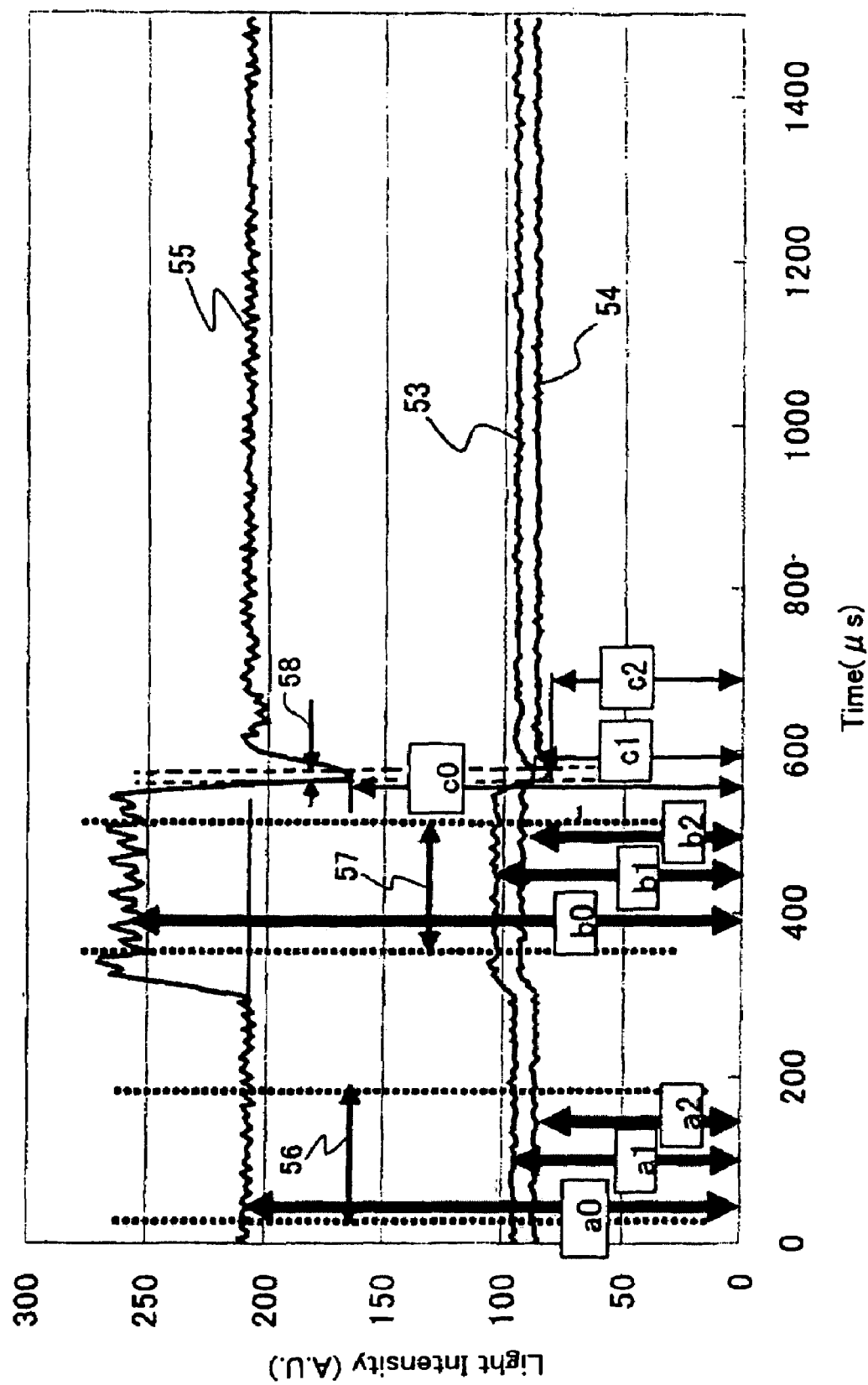
FIG. 7 shows waveforms indicating time-based variations of measured values by using a main detection unit and a subordinate detection unit of the radiant-temperature measurement device, and extraction intervals (time-frames) of the measured values used for temperature calculation.

By using FIG. 7, the above principle will be explained in more specific detail as follows. In FIG. 7, when an AC drive current in which the superimposed pulses are added as shown in FIG. 3 is supplied to the discharge lamp 1, variations in measured values versus time are shown in which two waveforms are originated in the light from one of the electrode portions 2 of the discharge lamp 1, and another waveform is originated in the discharge-light emission that is only a measuring object.

In FIG. 7, "53" and "54" indicate time-based waveforms of measured light-intensity (variations each versus time) in wavelength bands $\lambda 1$ and $\lambda 2$ having been obtained via the time-based data measurement unit 14 by measuring the signals inputted from the light detectors 9 and 10 of the main detection unit 51, respectively. "55" indicates a time-based waveform of measured light-intensity (variation versus time) having been obtained via the time-based data measurement unit 14 by measuring the signal inputted from the light detector 24 of the subordinate detection unit 52. Therefore, "53" and "54" indicate the light from one of the electrode portions 2 of the discharge lamp 1; namely, they show the time-based waveforms of light intensity in which stray light caused by the discharge-light emission is mixed with thermal radiation. "55" shows the time-based waveform of the light intensity originated in the discharge-light emission only. Hereinafter, "53" and "54" are referred to as "mixed-light intensity time-based waveforms," and "55" is referred to as a "discharge-light intensity time-based waveform."

In FIG. 7, in the time-based waveforms of light intensity each, the part in which the light intensity is rapidly increased corresponds to a cause originating in the drive current in which the superimposed pulses are added. In the figure, a time duration 56 (double-headed arrow) shows a duration of time (time-frame) in which influences caused by the superimposed pulses and by variation in light intensity derived from polarity reversals in the drive current are not present. A time duration 57 (double-headed arrow) shows a duration of time (time-frame) in which the light intensity is increased by one of the superimposed pulses, and is kept stable at the increased level.

Here, as shown in FIG. 7, based on the mixed-light intensity time-based waveforms 53 and 54, and on the discharge-light intensity time-based waveform 55, measured light-intensity values a1, a2, and a0 each are obtained during a measuring interval 1 in the time duration 56, respectively; and then, measured light-intensity values b1, b2, and b0 each are obtained during a measuring interval 2 in the time duration 57, respectively.

Here, "a1" and "b1" are the measured values with respect to the wavelength band λ1, and "a2" and "b2" are the measured values with respect to the wavelength band λ2; each of the four values is the measured value via the main detection unit 51. "a0" and "b0" are the measured values via the subordinate detection unit 52.

In order to obtain the values in the same measuring interval, by selecting a trigger signal generated in every period of time based on the drive current signal inputted from the light-source drive circuitry 4 (via its signal line 13) into the time-based data measurement unit 14 as a starting time-point, each of the measured values can be sampled after a predetermined time has elapsed. The predetermined time is set in advance by carrying out a preliminary measurement.

Moreover, instead of obtaining these values during each measuring interval or at a time point, they may be a mean value over a predetermined time. In the time durations 56 and 57 each, when there is no factor exits that varies a measured value largely other than a stochastic error, or when it is determined that the degree of variation is not a problem, by adopting a time-based mean value, it is possible to reduce the stochastic error or the like in the measured value. Therefore, it is possible to achieve increasing accuracy of a measured temperature value, as this will be described hereunder.

Furthermore, simultaneousness of the values a1, a2, and a0, and simultaneousness of the values b1, b2, and b0, are not necessarily precise. Namely, the measuring interval 1 may be during any time duration the superimposed pulses are not added; and then, the measuring interval 2 may be during any time duration in which the superimposed pulses are added, and the light intensity is increased reaching up to a constant value.

In addition, instead of selecting in the period of light intensity variation, but even in different periods, it may be possible to select that the measuring interval 1 is during any time duration the superimposed pulses are not added, and the measuring interval 2 is during any time duration in which the superimposed pulses are added and the light intensity is increased reaching up to a constant value. Namely, the measuring intervals 1 and 2 include the expanded meaning described above (and, e.g. a scope of their intermittent selection).

The measured light-intensity values a1, a2, and a0, and also b1, b2, and b0, having been measured in the time-based data measurement unit 14 are inputted into the temperature calculation unit 70; there, a temperature is derived based on the following principle.

First, because the measured light-intensity values a1, a2, b1, and b2, each are measured values in the main detection unit 51, stray light caused by the discharge-light emission is mixed onto the thermal radiation; thus, each of them can be regarded as a sum of both the thermal radiation and the discharge-light emission. Hereinafter, "a1" is taken as an example for explanatory purposes. A similar analysis can be held for "a2" also.

"a1" can be expressed by the following equation.

$$a1 = I1 + d1 \qquad \text{Equation (4)}$$

Here, "I1" denotes a contributory component (contribution) of the thermal radiation, and "d1" denotes an influence caused by the discharge-light emission.

Next, in a case of the mixed-light intensity time-based waveform 53, and also in a case of the discharge-light intensity time-based waveform 55, the increased amount of light intensity according to the superimposed pulses is, as explained above, due to the discharge-light emission. Therefore, the increased amount of light intensity according to the superimposed pulses obtained from the mixed-light intensity time-based waveform 53, i.e. "b1−a1" is originating in the discharge-light emission. Similarly, the increased amount of light intensity according to the superimposed pulses obtained from the discharge-light intensity time-based waveform 55, i.e. "b0−a0" is originating in the discharge-light emission. The difference between the both is, as a result, caused by the difference of intensity in the discharge-light emission included in the corresponding measuring-object light.

In addition, in the time-based waveform 55, a ratio between the measured light-intensity value b0 in which the superimposed pulses are added and the measured light-intensity value a0 in which they are not added, i.e. "b0/a0" does not depend on the discharge-light emission intensity, and the ratio should be constant. Therefore, with respect to the influential component "d1" of discharge-light emission included in the mixed-light intensity time-based waveform 53, the above characteristic holds true of the ratio "b0/a0" having been derived based on the discharge-light intensity time-based waveform 55. Thus, "d1" satisfies the next relationship.

$$((b1-a1)+d1)/d1 = b0/a0 \qquad \text{Equation (5)}$$

From Equation (5), the next equation can be derived that expresses for "d1."

$$d1 = a0 \times r \qquad \text{Equation (6)}$$

$$r = (b1-a1)/(b0-a0) \qquad \text{Equation (7)}$$

Here, "r" denotes, when the discharge-light emission intensity measured via the subordinate detection unit 52 is set as a reference, a degree or rate of influence caused by the discharge-light emission mixed as the stray light into the measurement via the main detection unit 51, namely, an influential rate of discharge-light emission.

Thus, "I1" that is a contributory component of the thermal radiation included in the measured value "a1" with respect to the wavelength band λ1 can be derived by the following equation.

$$I1 = a1 - a0 \times (b1-a1)/(b0-a0) \qquad \text{Equation (8)}$$

"I2" that is a contributory component of the thermal radiation included in the measured value "a2" with respect to the wavelength band λ2 can be similarly derived by the next equation.

$$I2 = a2 - a0 \times (b2-a2)/(b0-a0) \qquad \text{Equation (9)}$$

As shown in the next equation, an intensity ratio "R" that is a ratio of both the values "I1" and "I2" is derived.

$$R = I1/I2 \qquad \text{Equation (10)}$$

And now, a spectrum of thermal radiation emitted from a portion depends on temperature. Namely, a ratio of light intensities between the wavelength bands λ1 and λ2 depends on a temperature T. Therefore, the intensity ratio R that is a ratio between the measurement-based evaluation vales "I1" and "I2" has also a one-to-one corresponding relationship with respect to the temperature T of the electrode portions 2. Thus, when calibration data between the intensity ratio R and the temperature T is obtained in advance and retained to be referred, base on the intensity ratio R derived from above Equation (4) through Equation (10), the temperature T of the electrode portions 2 can be obtained.

In order to obtain the calibration data between the intensity ratio R and the temperature T, in place of a discharge lamp, a halogen lamp, a standard blackbody furnace, or the like in that stray light except thermal radiation (light) does not exit can be used. For these standard light sources, when the temperature T is measured by other means, and at the same time, the ratio between the measured values a1 and a2 with respect to the wavelength bands λ1 and λ2 obtained via the main detection unit 51 in the present invention is taken, the intensity ratio R is obtained, so that the calibration data between the intensity ratio R and the temperature T can be obtained.

Figure 8:
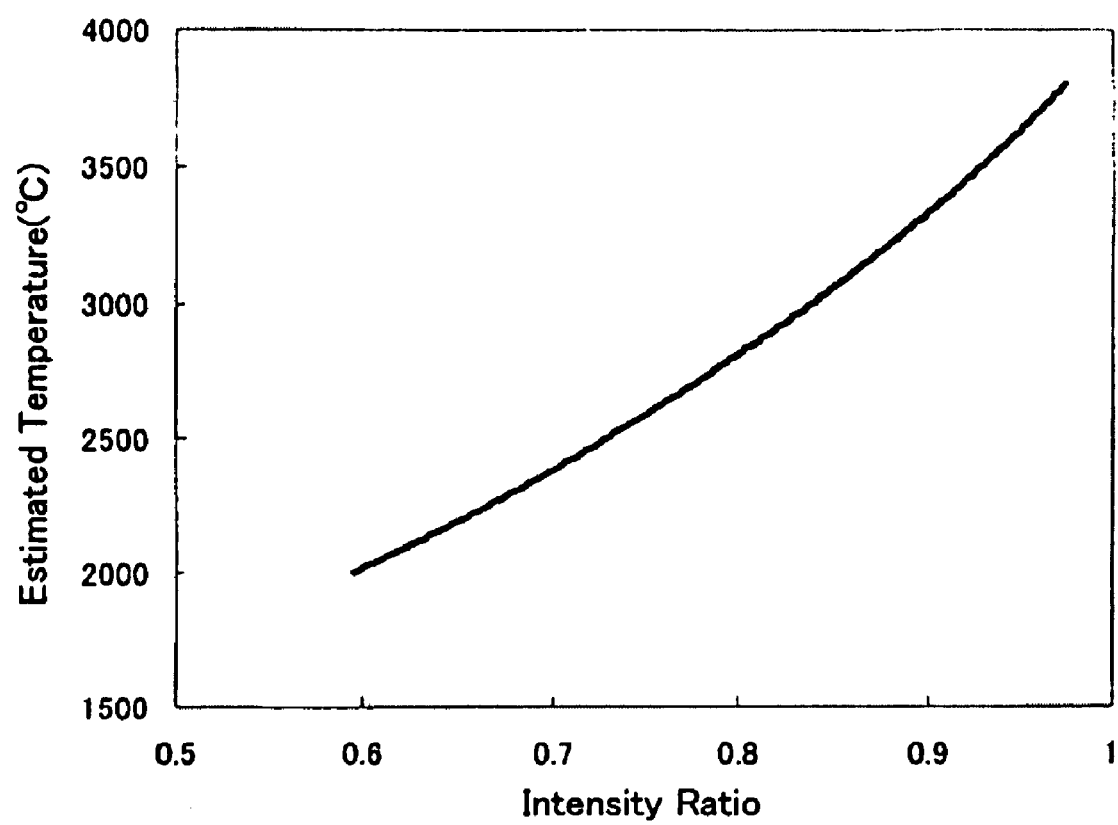
FIG. 8 is a diagram showing a temperature-calibration chart used for the radiant-temperature measurement device in Embodiment 1 of the present invention.
Figure 9:
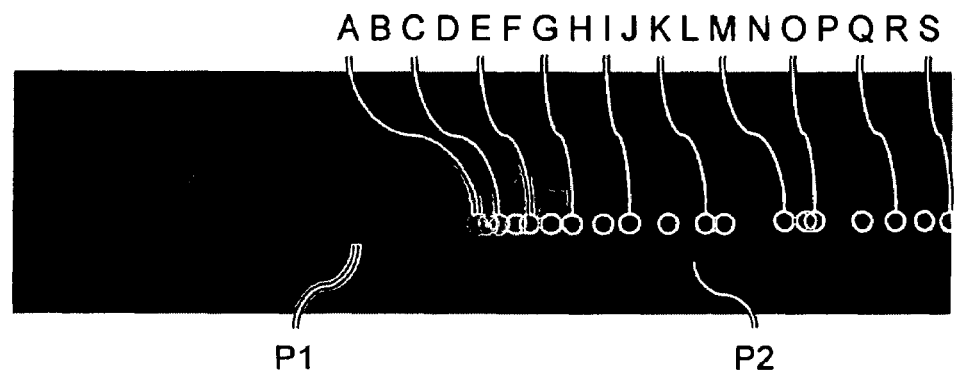
FIG. 9 is a diagram showing the lamp that is an object to be measured by the radiant-temperature measurement device in Embodiment 1 of the present invention.
Figure 10:
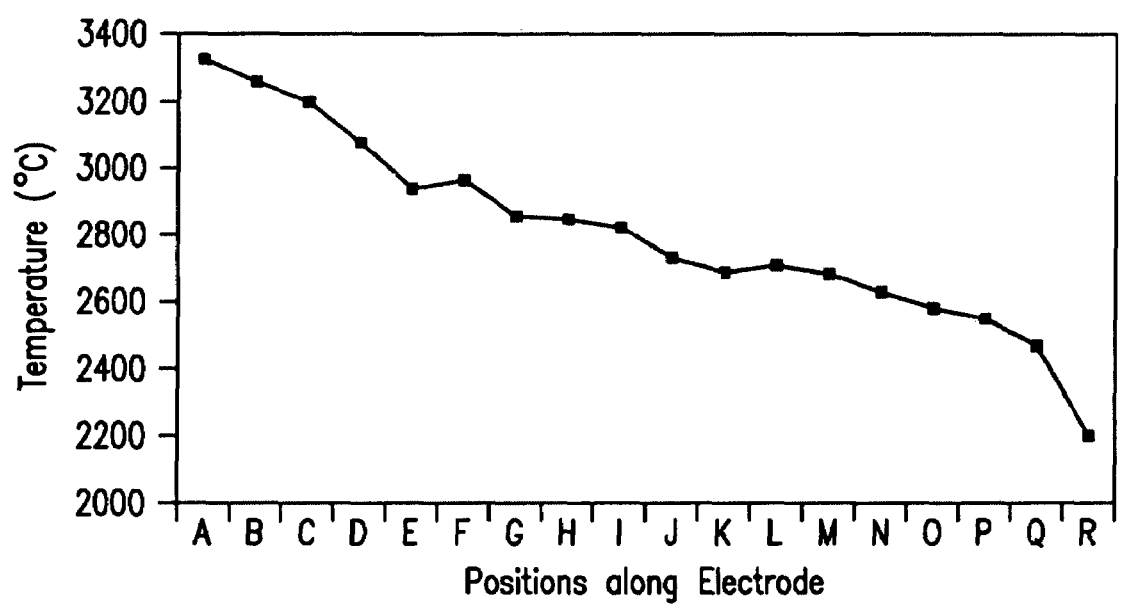
FIG. 10 is a diagram showing a measured result by using the radiant-temperature measurement device in Embodiment 1 of the present invention.

An example of the calibration data is shown in FIG. 8. FIG. 8 shows a relationship between the intensity ratio R and an estimated temperature T. Actual measured examples are shown in FIG. 9 and FIG. 10. P1 in FIG. 9 shows the discharge-light emitting portion. P2 in FIG. 9 shows the electrode portion. Corresponding to the positions "A" through "S" in FIG. 9, the temperatures are plotted in FIG. 10. As shown in the figures, by implementing this embodiment of the present invention, even when bright discharge-light emission exists in the very close proximity as stray light, a contributory component of the thermal radiation can be easily separated from the measured light-intensity values, and be evaluated. From the measured light-intensity values having been evaluated by separation, it is thus possible to measure the temperature on the electrodes based on the principle of the dual-wavelength radiant-temperature measurement method.

Moreover, by selecting the wavelength bands λ1 and λ2 outside a peak wavelength range of discharge-light emission spectrum, an influential component of stray light caused by the discharge-light emission to the measured values can be reduced from the beginning to a certain extent. By applying this embodiment of the present invention, it is possible to measure the temperature of light-emitting ends more accurately.

Figure 15:
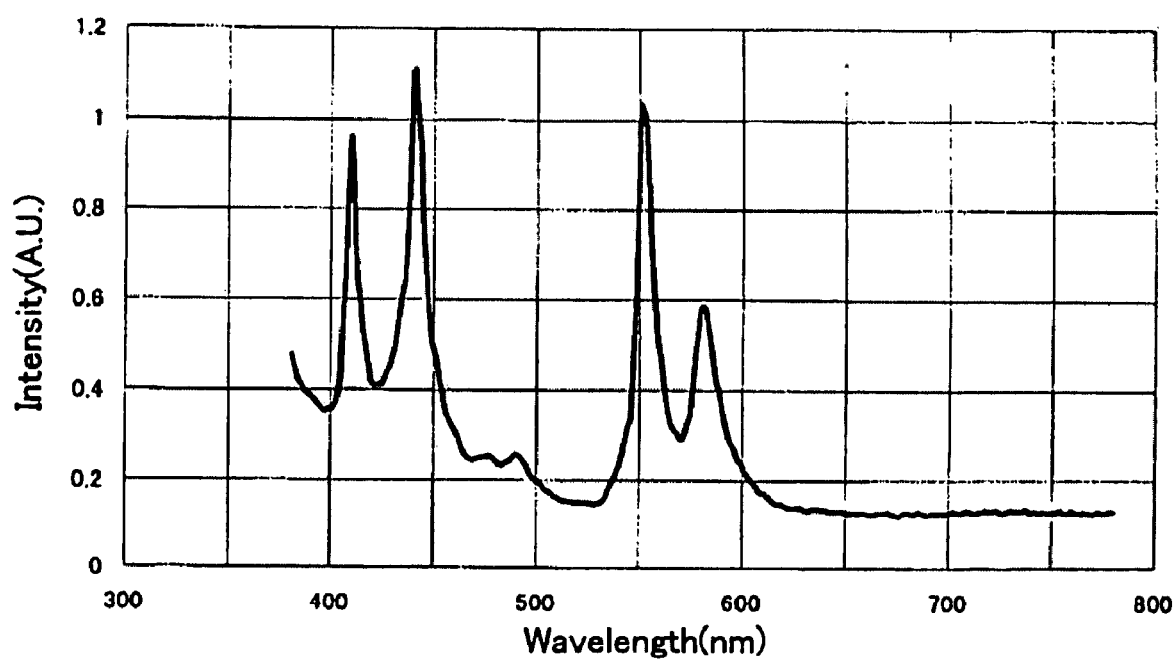
FIG. 15 is a spectrum diagram of discharge-light emission for explaining existence of stray light even when wavelengths at which discharge-light emission peaks are avoided in a conventional example.

For example, two measuring wavelengths are set near the values such as λ1=700 nm, and λ2=800 nm. When the two wavelengths are selected, as can be understood from FIG. 15 described above, because the peak wavelength range of the discharge-light emission spectrum is avoided, stray light caused by the discharge-light emission can be further lowered. As a matter of course, a wavelength band with longer wavelengths may be selected, or a wavelength near 530 nm which corresponds to a 'valley' between the discharge-light peaks may be selected.

However, it is also necessary to consider a sensitivity-spectrum characteristic of a light detector, and a wavelength band that has a large variation in the thermal radiation spectrum according to the temperature variation in a measuring-object's temperature range. By considering these points, when a spectrum of the discharge-light emission is similar to the one shown in FIG. 15, it will be a best choice when two wavelength bands in near-infrared are selected.

As the light detector to be used here, because it is necessary to respond fast in time according to a variation of the discharge-light emission when the superimposed pulses are added, a fast response characteristic is preferable. At the same time, in order to detect very weak light which is spectrally distributed, having high sensitivity is also preferable. To be more specific, it is preferable to use a photoelectron multiplier, an avalanche photodiode, or the like.

Embodiment 2

Figure 11:
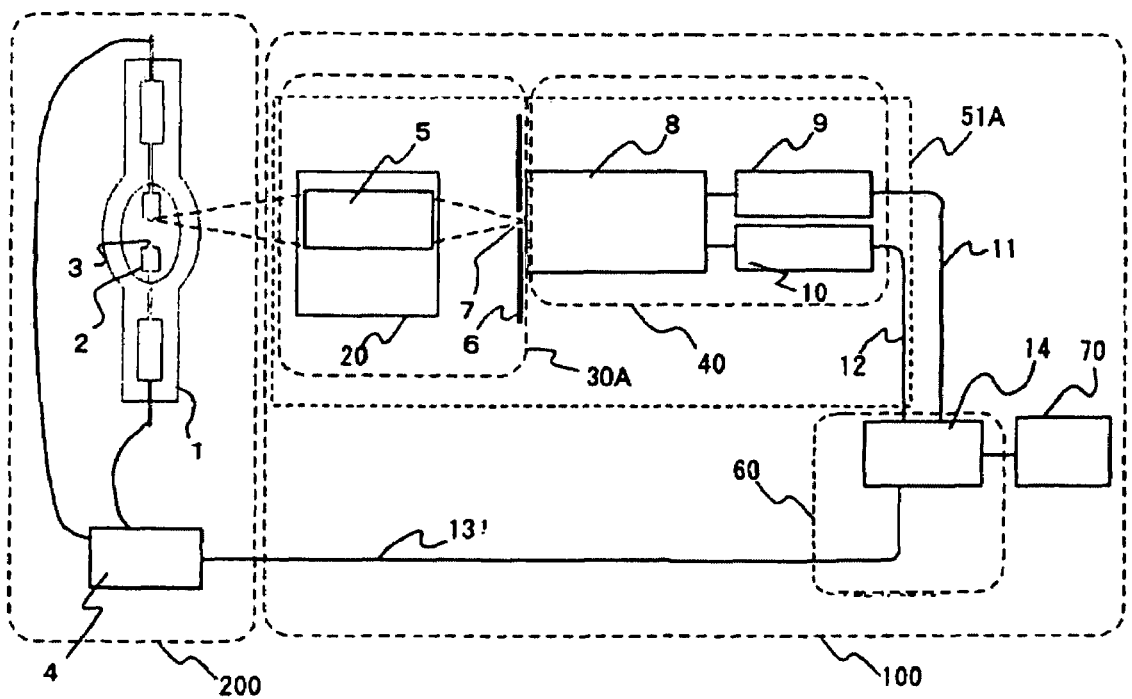
FIG. 11 is a diagram outlining a configuration of a radiant-temperature measurement device in Embodiment 2 of the present invention.

In this embodiment, a main detection unit 51A combines the function of the subordinate detection unit 52 specifically provided for measuring the discharge-light emission intensity in Embodiment 1. FIG. 11 shows a configuration of a radiant-temperature measurement device in this embodiment. A detection system or unit, that is a measurement unit, is constituted of the main detection unit 51A only, and a drive mechanism 20 that is a drive unit is equipped for the main detection unit 51A so that either a position or a direction of a space analysis unit 30A in the main detection unit 51A is changeable or adjustable. By providing the drive mechanism 20, a measuring-object's position via the projection unit 5 is so arranged that, by time sharing, the position can be changed between one of the electrode portions 2 and a discharge-light emitting portion of the discharge lamp 1. In FIG. 11, the same reference numerals and symbols designate the same items as or items corresponding to those shown in FIG. 1 in Embodiment 1; thus, their explanation is omitted.

Moreover, as an object to adjust either the position or the direction, not only the space analysis unit 30A, but also the spectrum analysis unit 40 may be together constructed to be changeable or adjustable. In addition, although the main detection unit 51A has a spectral measurement function, and is provided to measure light intensity in specific wavelength bands, the subordinate detection unit 52 in Embodiment 1 does not have the spectral measurement function. However, this has little effect on the present invention, in particular. This is because a spectrum of the discharge-light emission does not change, and its intensity only changes depending on measuring-object's position. Namely, a time-based waveform of the discharge-light intensity that is spectrally measured is identical to the one that is not spectrally measured. For this reason, there is no inconvenience in that the main detection unit 51A substitutes the subordinate detection unit 52.

As a measurement procedure in this case, first, by using the drive mechanism 20, the space analysis unit 30A is shifted, so that a measuring-object's position via the projection unit 5 is set at the discharge-light emitting portion. Then, a time-based waveform of the discharge-light emission that is a source of stray light is measured. Subsequently, by using the drive mechanism 20, the space analysis unit 30A is shifted again, so that a measuring-object's position via the projection unit 5 is set at one of the electrode portions 2 that is a primary measuring object. Then, a time-based waveform of light emission from one of the electrode portions 2 is measured. Moreover, as a method to adjust a light-imaging position to the pinhole 7 on the screen 6, it is also possible to confirm by shifting a position of the projection unit 5; on the other hand, it is also possible to confirm by changing a position of the pinhole 7 by shifting the screen 6. In either case, this can be carried out via the drive mechanism 20.

In this manner, by providing the drive mechanism 20, and by applying the time sharing so as to shift the measuring-object's positions in the main detection unit 51A, it combines the function of the subordinate detection unit 52. By this way, an expensive detection system or unit can be eliminated by one channel; thus, it is possible to reduce in expenses, and to save space.

Embodiment 3

Figure 12:
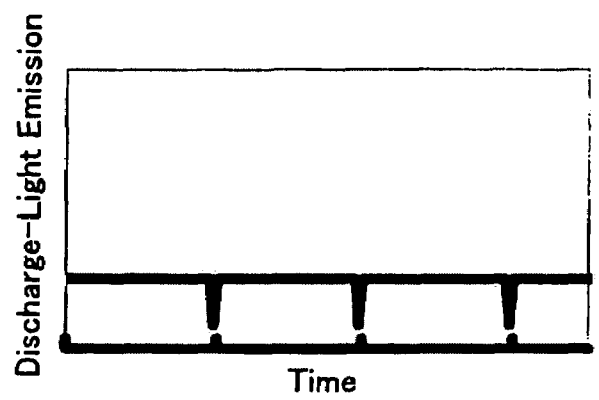
FIG. 12 is a waveform showing a variation of discharge-light emission intensity generated under an AC drive without superimposed pulses in Embodiment 3 of the present invention.

In this embodiment, there are features in that superimposed pulses are not added. There are some cases in which a lamp drive method does not apply the superimposed pulses; however, in such cases, according to the present invention as described in this embodiment, similarly to the manners as set forth in Embodiment 1 or Embodiment 2, components originating in thermal radiation can be separated from measured time-based light-intensity waveforms, and be evaluated. When superimposed pulses are not added, the drive current waveform is shown in FIG. 2, as this has already been explained above. FIG. 12 is a time-based waveform showing discharge-light emission intensity of the discharge lamp 1 when it is driven under such a condition. FIG. 12 and FIG. 2 are shown in the same time scale (the horizontal axis); according to FIG. 12, it can be understood that, when the drive current (so its positive or negative polarity) is reversed at recurring intervals of time as shown in FIG. 2, the discharge-light emission intensity is lowered, correspondingly. In this embodiment, time-based variation in the discharge-light emission intensity is utilized, so that a contributory component in a thermal radiation spectrum of one of the electrode portions is separated from measured values.

Although in FIG. 7, measured light-intensity results are shown when the superimposed pulses are added, the measured values are simultaneously lowered at the time when each of the superimposed pulses goes down (i.e. on the trailing edge of pulse), namely when the drive current reverses its polarity. From this viewpoint, similar lowering tendencies have been demonstrated when the superimposed pulses are not added (as shown in FIG. 12). Therefore, FIG. 7 is also used for explaining this embodiment. Namely, as shown in FIG. 7, when the drive current reverses its polarity, a "dip" or U-shaped duration 58 (time-frame) appears in each of the measured time-based light-intensity waveforms (measured light-intensity values c0, c1, and c2 each are shown in the figure corresponding to the measuring points for each dip). As explained in Embodiment 1, a time-based variation of light intensity is originated in time-based variation of the discharge-light emission, but not due to a variation of the thermal radiation.

By also using FIG. 7, a measured light-intensity value is denoted as c0, c1, and c2, for each dip. And then, by replacing the values b0, b1, and b2 described in Embodiment 1 by these values c0, c1, and c2, respectively, based on the method explained in Embodiment 1, the temperature Tat one of the electrode portions 2 can be measured.

Measuring intervals to measure values a0, a1, and a2, and also the values c0, c1, and c2 may be taken based on a trigger signal inputted from the light-source drive circuitry 4 (via its signal line 13) into the time-based data measurement unit 14 as a starting point, in the same manner as described in Embodiment 1. It should be noted that, in comparison to an accuracy required for measuring intervals in Embodiment 1 of the present invention, the degree of accuracy required for the measuring intervals in this embodiment of the present invention is much higher. This is because, as shown in FIG. 12 or FIG. 7, duration time of each dip is short in comparison to the duration in which the light intensity varies according to each of the superimposed pulses; thus, without measuring exactly by aiming at a measuring interval that corresponds to each dip, an error imposed in the measured value is large.

In this manner, according to Embodiment 3, even when superimposed pulses are not added to the drive current of a discharge lamp, by focusing on the variation of measured light-intensity at polarity reversals in the drive current, it is possible to evaluation temperature at the electrode portions 2 with ease.

Embodiment 4

In Embodiment 1, superimposed pulses are added to the AC drive current in the same polarity as the drive-current polarity; however, in this embodiment of the present invention, the polarity of superimposed pulse current is reversed with respect to the polarity of the AC drive current. Therefore, contrary to the case in Embodiment 1, discharge-light emission intensity decreases in the time duration that corresponds to each of the superimposed pulses added. Even in this case, according to the similar principle in Embodiment 1, Equation (4) through Equation (10) are equally held. Therefore, based on these equations, influences originating in the discharge-light emission can be removed, so that contributory components of the thermal radiation at the electrode portions can be separated; thus, evaluation thereof can be carried out.

Embodiment 5

In this embodiment of the present invention, by using a radiant-temperature measurement device described in any one of Embodiment 1 through Embodiment 4, while measuring temperature at the electrode portions 2 of the discharge lamp 1, a light-source temperature control device includes functioning to curb the electrode temperature within a constant temperature range.

Figure 13:
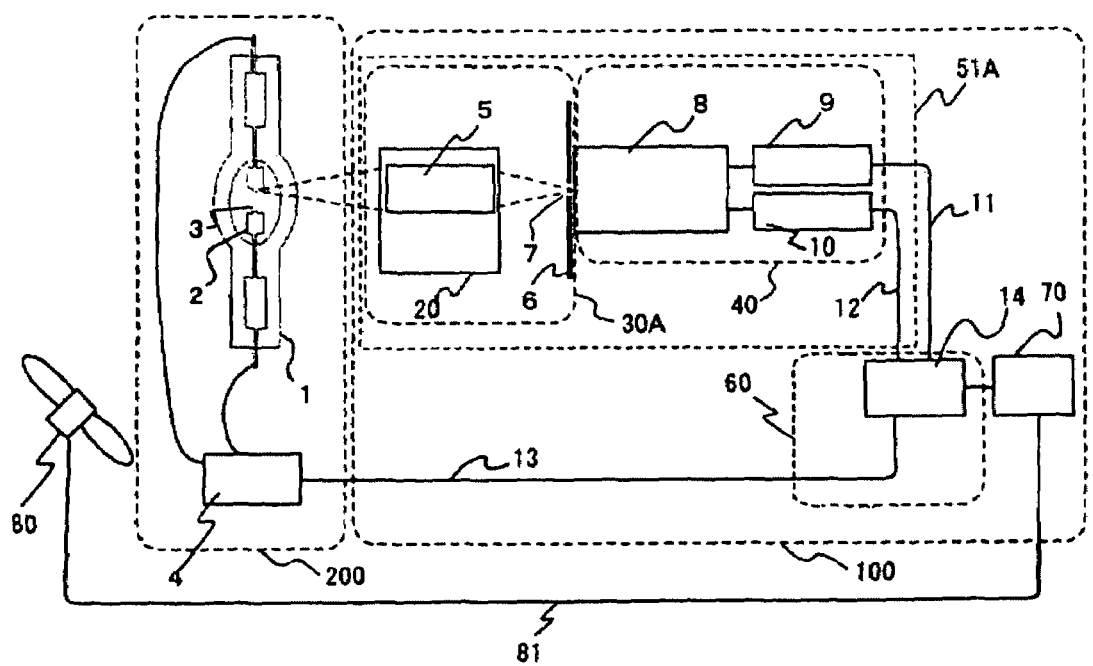
FIG. 13 is a diagram outlining a configuration of a light-source temperature control device in Embodiment 5 of the present invention.

In FIG. 13, a configuration of the light-source temperature control device in this embodiment is shown. The light-source temperature control device is constructed of the radiant-temperature measurement device 100 as explained above, a cooling unit 80 that is a cooling means such as a cooling fan placed near the light-source unit 200 and having a function to regulate the temperature at the electrode portions 2 of a discharge lamp, and a temperature-signal feedback cable 81 that connects between the cooling unit 80 and the temperature calculation unit 70.

The operations of the light-source temperature control device are explained as follows.

First, it is presumed that, for the temperature calculation unit 70, a temperature range is given in advance as a pre-set temperature range under which temperature of the electrode portions 2 should be controlled. And then, the temperature calculation unit 70 measures and evaluate the temperature at the electrode portions 2 by using the radiant-temperature measurement device described in any one of Embodiment 1 through Embodiment 4. In the temperature calculation unit 70, the temperature at the electrode portions 2, having been measured and evaluated, is determined whether or not it is within the pre-set temperature range inputted in advance. When the measured and evaluated temperature is within the pre-set temperature range, the temperature calculation unit 70 does not take any action to the cooling unit 80. Therefore, the cooling unit 80 continues operating in the present state. When the cooling unit 80 is a cooling fan, the amount of air flow by the cooling fan is kept at the present level.

When the measured and evaluated temperature is higher than the pre-set temperature range, the temperature calculation unit 70 sends a control signal to the cooling unit 80 via the temperature-signal feedback cable 81, so as to increase the cooling capacity. When the cooling unit 80 is the cooling fan, the amount of air flow by the cooling fan is increased.

When the measured and evaluated temperature is lower than the pre-set temperature range, the temperature calculation unit 70 sends a control signal to the cooling unit 80 via the temperature-signal feedback cable 81, so as to decrease the cooling capacity. When the cooling unit 80 is the cooling fan, the amount of air flow by the cooling fan is decreased.

Although optimum conditions as the temperature range for the electrode portions 2 may differ depending on a first priority taken from among brightness, extended operating life, flicker countermeasures, or the like, there may be cases in which, for example, a temperature range of 3700° C.±200° C. that is a little over the melting point of tungsten electrodes is taken for the control purposes.

In this manner, by performing a feedback control using a measured temperature signal, the operations can be kept under optimum conditions in the temperature at electrode portions; thus, it is possible to provide a stable and highly reliable lamp. As a consequence, it is further possible to extend the operating life of the light source.

Moreover, although in FIG. 13, the radiant-temperature measurement device in Embodiment 2 is shown as the radiant-temperature measurement device in this embodiment, it is also possible to apply the radiant-temperature measurement device described in Embodiment 1 in that the subordinate detection unit is separately provided with the main detection unit; there exist similar effects described above. In addition, although the temperature calculation unit 70 is used as an example and explained in this embodiment as a temperature control means or unit, instead of using the temperature calculation unit 70, it is also possible to independently provide a temperature control means or unit that can perform the function to control the temperature at the electrode portions 2 by the cooling unit 80.

Embodiment 6

Figure 14:
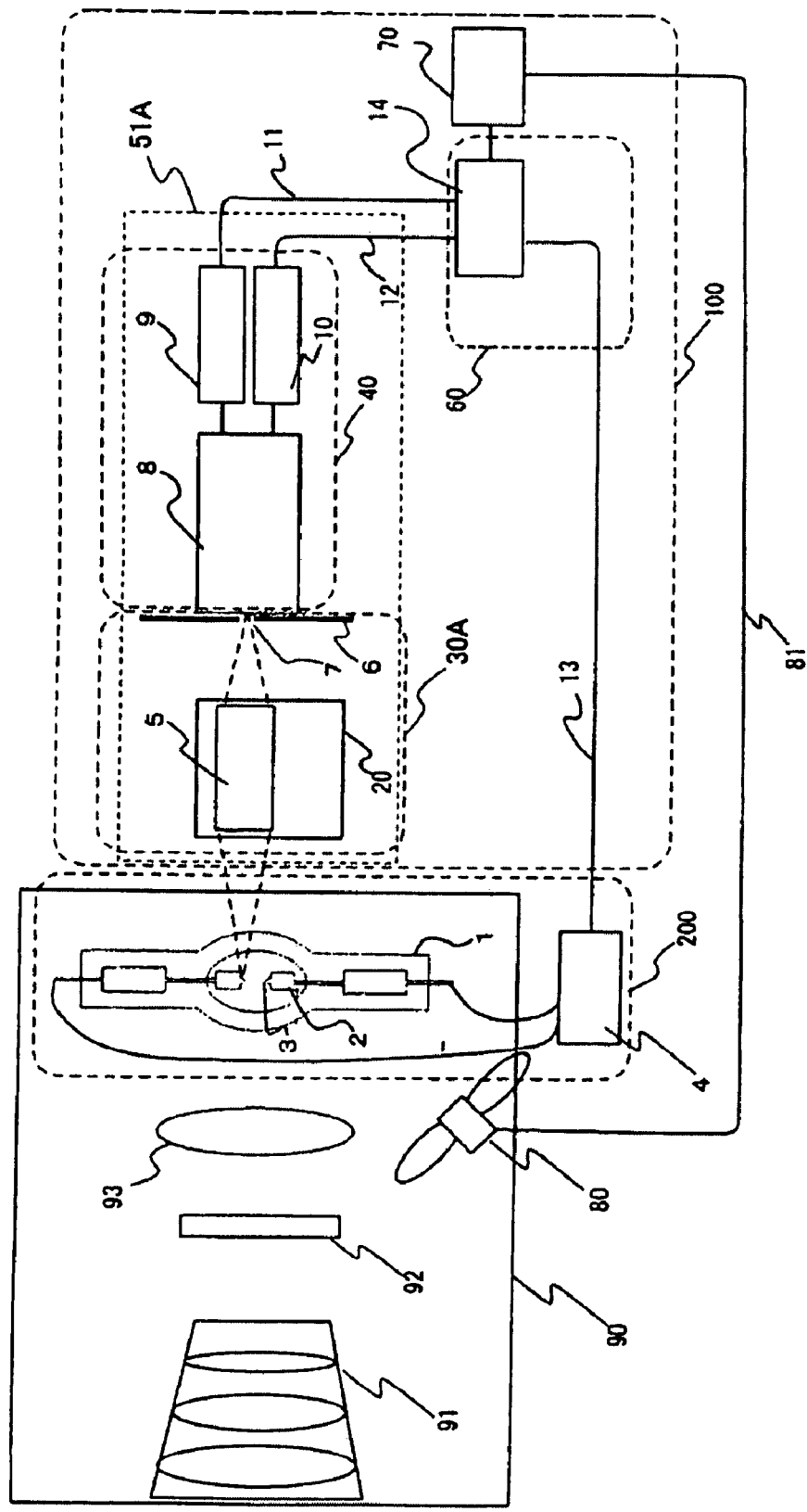
FIG. 14 is a diagram outlining a configuration of an image projection apparatus in Embodiment 6 of the present invention.

In this embodiment of the present invention, an image projection apparatus is provided, as its configuration is shown in FIG. 14. The image projection apparatus shown in FIG. 14 is constructed of the light-source unit 200, a light-source temperature control device described in Embodiment 5 that measures temperature of electrode portions of a lamp, based on the measured temperature of electrode portions, and controls the temperature of the electrode portions within a predetermined temperature range, and an image-projection optical system 90 that shines light from the light-source unit 200 onto an image display element, and to project images on the image display element into a predetermined position of, for example, a screen.

The image-projection optical system 90 may be any one of the systems usually applicable to image projection apparatus. For example, it may be constructed of an image display element 92, a projection lens 93 that is placed between the discharge lamp 1 and the image display element 92 so as to shine the light from the discharge lamp 1 onto the image display element 92, and a condenser lens unit 91 that projects the light (images) having been shined onto the image display element 92, and passing through it or being reflected by it.

In the image projection apparatus constructed as above, because the light source is used under the optimum electrode temperature conditions, the operating life of the light source can be extended, and replacement frequency of the light source ascribable to a life of the light source can be reduced; because of reduction in maintenance hours, it is possible to expect an increase in usage of the image projection apparatus, and a decrease in maintenance costs.

While the present invention has been shown and described in detail, the foregoing description is in all aspects illustrative and not restrictive. It is therefore understood that numerous modifications and variations can be realized without departing from the scope of the invention.

What is claimed is:

1. A radiant-temperature measurement device, comprising:
a first measurement unit for measuring, from among light-source light emitted from a light source having light-emitting ends in which a pattern of variation in light intensity versus time is repeated at predetermined periods each including a first intensity duration and a second intensity duration during which the second intensity differs from the first intensity, an intensity of first light originating in the light-source light;
a second measurement unit for measuring an intensity of second light, in which stray light originating in the light-source light is superimposed onto thermal radiation emitted from one of the light-source's light-emitting ends, in each of a first wavelength band and a second wavelength band, whose wavelengths differ from each other;
a time-based data measurement unit
for acquiring, based on the intensity of the first light measured by the first measurement unit, a first data value during a first measuring interval in the first intensity duration, and a second data value during a second measuring interval in the second intensity duration, and
for acquiring, based on the intensity of the second light measured by the second measurement unit, a third data value in the first wavelength band, and a fourth data value in the second wavelength band, during the first measuring interval, and a fifth data value in the first wavelength band, and a sixth data value in the second wavelength band, during the second measuring interval; and
a temperature calculation unit for calculating, based on the first, second, third, fourth, fifth, and sixth data values, the temperature of the light source at its light-emitting end.

2. The radiant-temperature measurement device as set forth in claim 1, wherein the first measuring interval and the second measuring interval are respectively selected to be within a time-frame when a superimposition pulse is added to a stepwise-changing alternating-current drive current supplied to the light source, the polarity of the superimposition pulse reversing with the same periodicity as the drive current, and the superimposition pulse being added every time the polarity of the drive current switches, and to be within a time-frame when the superimposition pulse is not added.

3. The radiant-temperature measurement device as set forth in claim 1, wherein the first measuring interval and the second measuring interval are respectively selected to be within a time-frame when the intensity of the light-source light varies when the polarity of a stepwise-changing alternating-current drive current supplied to the light source reverses, and to be within a time-frame when the intensity of the light-source light does not vary.

4. The radiant-temperature measurement device as set forth in claim 2, wherein the first data value, the third data value, and the fourth data value during the first measuring interval are mean values of each data over the first intensity duration, respectively, and the second data value, the fifth data value, and the sixth data value during the second measuring interval are mean values of each data over the second intensity duration, respectively.

5. A radiant-temperature measurement device, comprising:
a measurement unit
for measuring, from among light-source light emitted from a light source having light-emitting ends in which a pattern of variation in light intensity versus time is repeated at predetermined periods each including a first intensity duration and a second intensity duration during which the second intensity differs from the first intensity, an intensity of first light originating in the light-source light, during a predetermined measuring interval, in either of a first wavelength band or a second wavelength band, whose wavelengths differ from each other, and
for measuring an intensity of second light, in which stray light originating in the light-source light is superimposed onto thermal radiation emitted from one of the light-source's light-emitting ends, during a measuring interval that differs from the predetermined measuring interval, in each of a first wavelength band and a second wavelength band, whose wavelengths differ from each other;
a drive unit for changing either a position or a direction of said measurement unit so that, during the predetermined measuring interval, said measurement unit measures the intensity of the first light, and during the measuring interval that differs from the predetermined measuring interval, said measurement unit measures the intensity of the second light;

a time-based data measurement unit
for acquiring, based on the intensity of the first light measured by the measurement unit, a first data value in the first intensity duration and during a first measuring interval in which said measurement unit measures the intensity of the first light, and a second data value in the second intensity duration and during a second measuring interval in which said measurement unit measures the intensity of the first light, and
for acquiring, based on the intensity of the second light measured by the measurement unit, a third data value in the first wavelength band, and a fourth data value in the second wavelength band, in the first intensity duration and during a third measuring interval in which said measurement unit measures the intensity of the second light, and a fifth data value in the first wavelength band, and a sixth data value in the second wavelength band, in the second intensity duration and during a fourth measuring interval in which said measurement unit measures the intensity of the second light; and
a temperature calculation unit for calculating, based on the first, second, third, fourth, fifth, and sixth data values, the temperature of the light source at its light-emitting end.

6. The radiant-temperature measurement device as set forth in claim 5, wherein the first measuring interval, the second measuring interval, the third measuring interval, and the fourth measuring interval are respectively selected to be within a time-frame when a superimposition pulse is added to a stepwise-changing alternating-current drive current supplied to the light source, the polarity of the superimposition pulse reversing with the same periodicity as the drive current, and the superimposition pulse being added every time the polarity of the drive current switches, and to be within a time-frame when the superimposition pulse is not added.

7. The radiant-temperature measurement device as set forth in claim 5, wherein the first measuring interval, the second measuring interval, the third measuring interval, and the fourth measuring interval are respectively selected to be within a time-frame when the intensity of the light-source light varies when the polarity of a stepwise-changing alternating-current drive current supplied to the light source reverses, and to be within a time-frame when the intensity of the light-source light does not vary.

8. The radiant-temperature measurement device as set forth in claim 6, wherein
the first data value is a mean value of each data over the first intensity duration and a duration in which the measurement unit measures the intensity of the first light;
the second data value is a mean value of each data over the second intensity duration and a duration in which said measurement unit measures the intensity of the first light;
the third data value and the fourth data value are mean values of each data over the first intensity duration and a duration in which said measurement unit measures the intensity of the second light; and
the fifth data value and the sixth data value are mean values of each data over the second intensity duration and a duration in which said measurement unit measures the intensity of the second light.

9. A light-source temperature control device, comprising:
a cooling unit for reducing the temperature of the light-source's light-emitting ends;
a radiant-temperature measurement device as set forth in any one of claims 1 through 8, for measuring the temperature of a light-emitting end of the light source; and
a temperature control unit, into which is inputted the light-source's light-emitting-end temperature obtained by said radiant-temperature measurement device, for controlling, based on the temperature of the light-source's light-emitting end, the operation of said cooling unit.

10. An image projection apparatus, comprising:
a light source;
an image display element;
an image-projection optical system for shining light-source light from said light source onto said image display element, so as to project images on said image display element into a predetermined position; and
a light-source temperature control device as set forth in claim 9.

11. A method of measuring a radiation-temperature, comprising:
measuring, from among light-source light emitted from a light source having light-emitting ends in which a pattern of variation in light intensity versus time is repeated at predetermined periods each including a first intensity duration and a second intensity duration during which the second intensity differs from the first intensity, an intensity of first light originating in the light-source light;
measuring an intensity of second light, in which stray light originating in the light-source light is superimposed onto thermal radiation emitted from one of the light-source's light-emitting ends, in each of a first wavelength band $\lambda 1$ and a second wavelength band $\lambda 2$, whose wavelengths differ from each other;
acquiring, based on the intensity of the first light, a first data value a0 during a first measuring interval in the first intensity duration, and a second data value b0 during a second measuring interval in the second intensity duration;
acquiring, based on the intensity of the second light, a third data value $a(\lambda 1)$ in the first wavelength band $\lambda 1$, and a fourth data value $a(\lambda 2)$ in the second wavelength band $\lambda 2$, during the first measuring interval, and a fifth data value $b(\lambda 1)$ in the first wavelength band $\lambda 1$, and a sixth data value $b(\lambda 2)$ in the second wavelength band $\lambda 2$, during the second measuring interval; and
calculating, using a calculation unit, the temperature of the light source at its light-emitting end in such a way that, by substituting the first data value a0, the second data value b0, the third data value $a(\lambda 1)$, the fourth data value $a(\lambda 2)$, the fifth data value $b(\lambda 1)$, and the sixth data value $b(\lambda 2)$ into Equation 1 and Equation 2 a thermal radiation intensity I1 in the first wavelength band $\lambda 1$ and a thermal radiation intensity I2 in the second wavelength band $\lambda 2$, in the thermal radiation emitted from one of the light-source's light-emitting ends, are separated from each other and evaluated, and simultaneously by substituting the thermal radiation intensity I1 in the first wavelength band $\lambda 1$ and the thermal radiation intensity I2 in the second wavelength band $\lambda 2$ into Equation 3, an intensity ratio R is obtained, and retained data showing the relationship between the intensity ratio R and the temperature is referred, wherein Equation 1, Equation 2, and Equation 3 are as follows:

$$I1 = a(\lambda 1) - a0 \times \frac{b(\lambda 1) - a(\lambda 1)}{b0 - a0} \qquad \text{Equation (1)}$$

$$I2 = a(\lambda 2) - a0 \times \frac{b(\lambda 2) - a(\lambda 2)}{b0 - a0}, \text{ and} \qquad \text{Equation (2)}$$

$$R = \frac{I1}{I2}. \qquad \text{Equation (3)}$$

* * * * *